Patented May 7, 1940

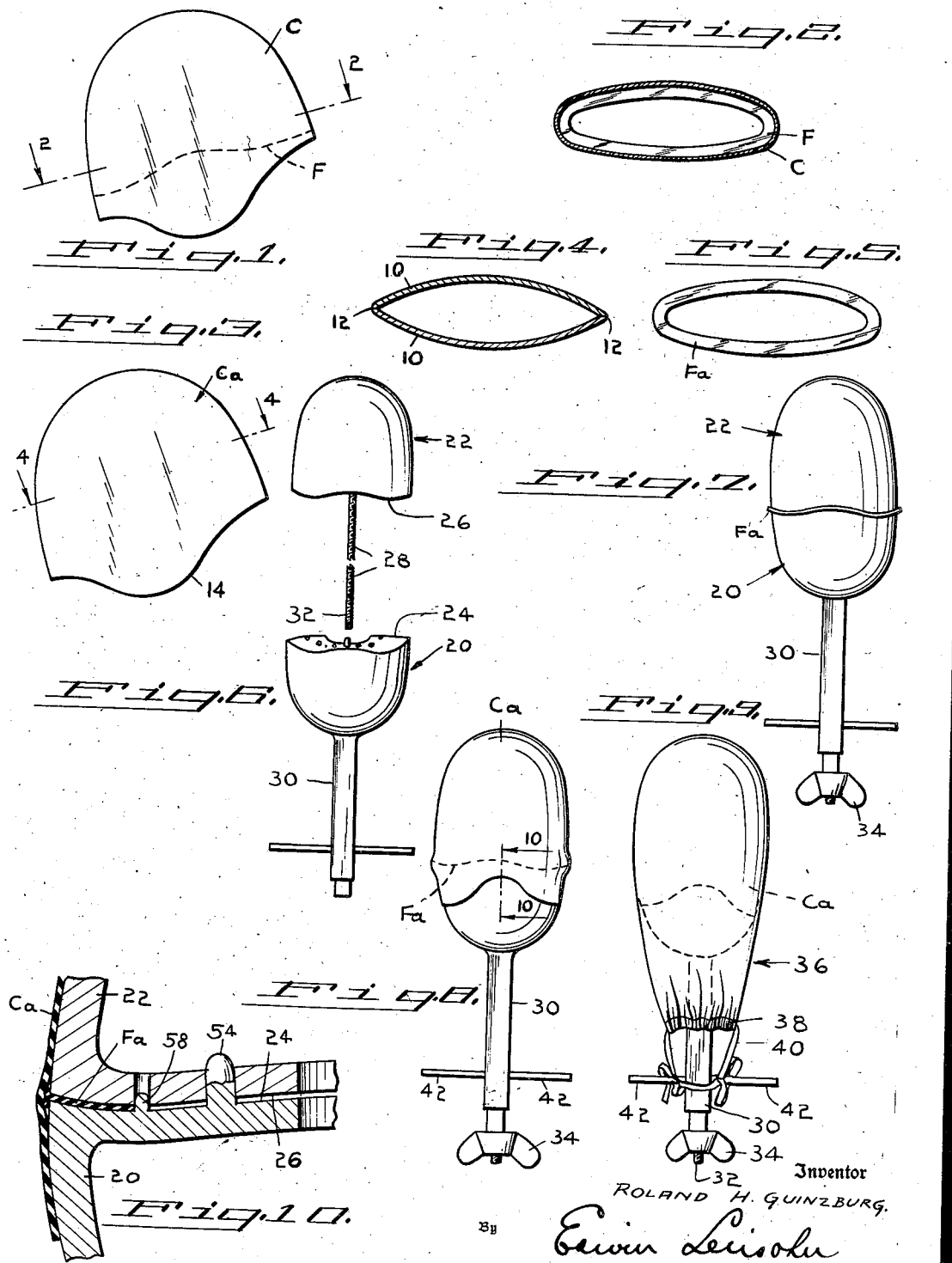

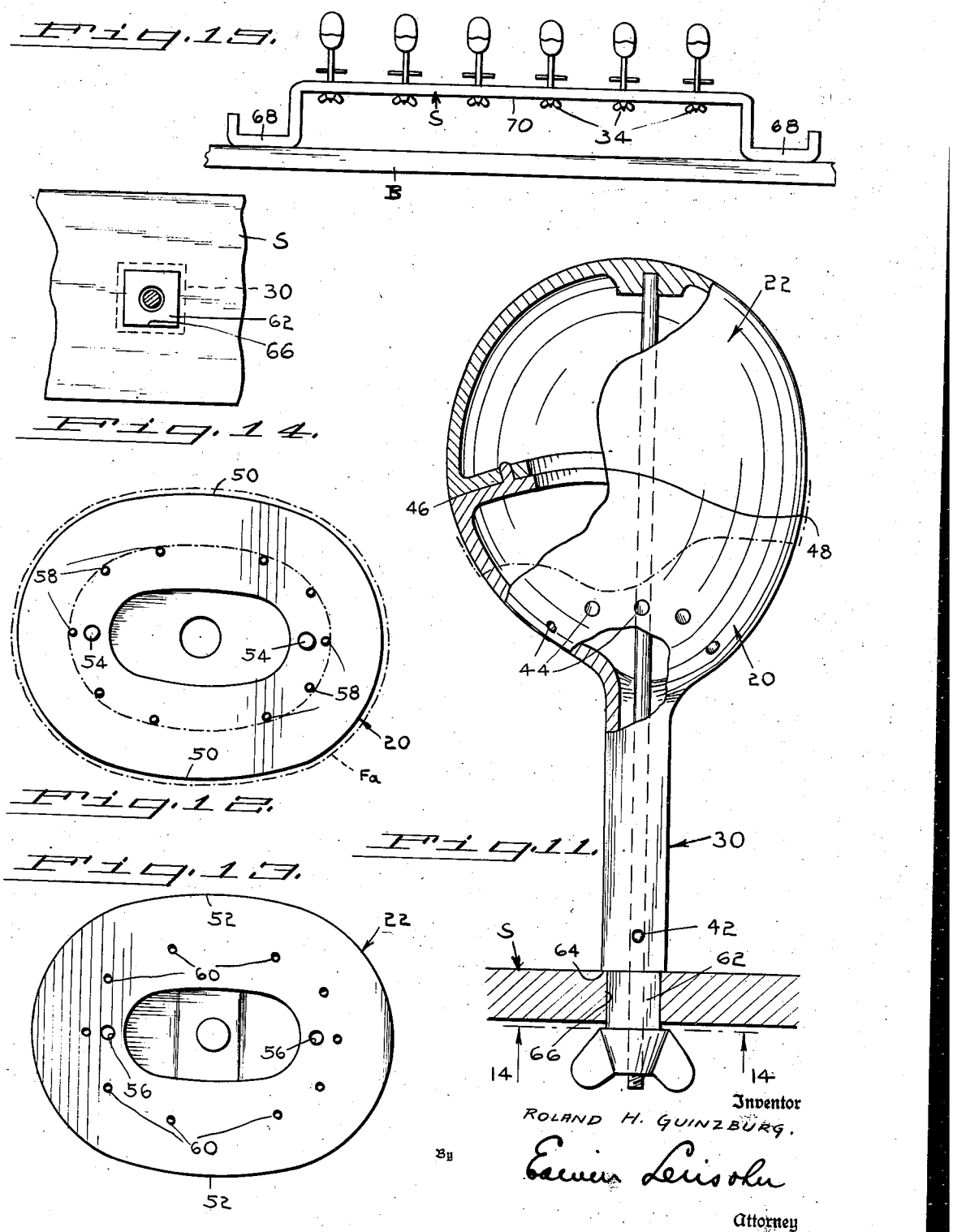

2,199,790

UNITED STATES PATENT OFFICE 2,199,790

METHOD AND APPARATUS FOR PRODUCING RUBBER ARTICLES

Roland H. Guinzburg, Flushing, N. Y., assignor to I. B. Kleinert Rubber Company, New York, N. Y.

Application October 7, 1937, Serial No. 167,764

9 Claims. (Cl. 18—19)

The present invention relates to the manufacture of rubber articles and, more particularly, is concerned with a method of producing hollow rubber articles, for example bathing caps, and to apparatus for making such articles.

While useful for other purposes, the method and apparatus of the present invention are concerned, in their more specific aspects, with the production of bathing caps provided with internal water sealing flanges by preliminarily defining the caps and the flanges from vulcanizable sheet material, specifically unvulcanized or partially vulcanized sheet rubber, then uniting the flanges with the bodies of the caps and molding said bodies to the desired contour, and finally vulcanizing the caps thus provided with said sealing flanges. The main object of the invention is the provision of an improved method and apparatus for manufacturing caps of this type.

Hollow rubber articles, such as bathing caps provided with water sealing flanges of the type herein contemplated have heretofore been manufactured by molding the cap bodies and flanges in unitary relation from rubber in pressure molds of the type in which cores are utilized for obtaining the hollow cap bodies and in which metal mold sections are provided for ornamenting the outer surfaces of said bodies. Bathing caps without such flanges have also been manufactured by preliminarily defining the cap bodies from sheet rubber and then molding said bodies to the desired contour and simultaneously ornamenting the surfaces of the caps by placing said bodies over suitable forms and molding them to the contour of said forms and simultaneously impressing a relief pattern on the surfaces of the caps by means of flexible pattern-carrying elements in the manner similar to that disclosed in my application, Serial No. 36,140, filed August 14, 1935 for Apparatus for molding and ornamenting rubber articles. Another object of the present invention is the production of bathing caps provided with water sealing flanges by a method similar to that disclosed in said application in which the cap bodies are preliminarily defined from sheet rubber and then simultaneously united with the flanges and shaped to the contour of the forms by flexible elements which may also constitute means for applying to the caps the desired surface ornamentation. It is also an object of the present invention to provide an improved apparatus constructed and arranged to facilitate the manufacture of bathing caps provided with water sealing flanges whereby to facilitate the manufacture of such caps in accordance with the method of the present invention.

A yet further object is generally to improve the art of manufacturing bathing caps and other hollow rubber articles in which initially separate preliminarily defined sheet rubber parts are united and shaped to the desired contour.

The above objects of the invention and other objects which might hereinafter appear will best be understood from the following description considered with reference to the accompanying drawings.

In the drawings:

Fig. 1 is a side view of a bathing cap made in accordance with the present invention;

Fig. 2 is a sectional view on the line 2—2 of Fig. 1;

Fig. 3 is a side view of a bathing cap body as preliminarily defined from unvulcanized sheet rubber;

Fig. 4 is a sectional view on the line 4—4 of Fig. 3, showing the cap-body partly open;

Fig. 5 is a plan view of a water sealing flange preliminarily defined from unvulcanized sheet rubber;

Figs. 6 to 9, inclusive, are more or less diagrammatic views illustrating steps in the method of making the cap illustrated in Figs. 1 and 2;

Fig. 10 is a fragmentary sectional view, on a larger scale, on the line 10—10 of Fig. 8;

Fig. 11 is a side view of a mold embodying the present invention, parts of the mold being broken away for the sake of clearness of illustration;

Fig. 12 is a top plan view of the lower mold section, showing the water sealing flange in dotted lines in position thereon;

Fig. 13 is a bottom plan view of the upper mold section;

Fig. 14 is a sectional view on the line 14—14 of Fig. 11;

Fig. 15 is a side view of a mold support provided with a plurality of molds embodying the present invention.

The articles produced in accordance with the present invention are made from vulcanizable material, such as vulcanized or partially vulcanized sheet rubber. For convenience in reference, however, such vulcanizable sheet rubber, whether partially or wholly unvulcanized, will be referred to as "unvulcanized". As indicated, said articles are made from preliminarily defined unvulcanized parts and then assembled and united and also shaped to the desired contour which is preserved by subsequent vulcanization. Further, if desired, the surface of the article is ornamented preferably simultaneously with the shaping of the body of the article.

In Figs. 1 and 2 there is illustrated a rubber bathing cap C provided with an internal water sealing flange F which, as here shown, extends completely around the cap and projects from the inner surface thereof substantially at right angles thereto in position to engage the wearer's head at the forehead, at the sides immediately above the ears and at the back of the head forming a seal with the wearer's head to prevent the entrance of water thereby to prevent the wearer's hair from getting wet. Flange F is composed of sheet rubber of about the same thickness as the sheet rubber of the body of the cap and is united at its inner peripheral edge with the inner surface of the cap body, and extends at right angles to said surface of the body so that when the cap is put on, said flange is turned upwardly by the engagement of the wearer's head therewith to, in the act of putting on the cap, the inner edge portion of said flange being stretched somewhat and thereby closely fitting the wearer's head. It will be understood that the free outer edge of the cap is also intended to closely fit against the head thus forming a seal to prevent the entrance of water and that the flange F furnishes a second seal which prevents any water which might penetrate through the cap below said flange from reaching the wearer's head. It will be observed that, as shown in Fig. 2, the body of the cap is not perfectly circular in section but is somewhat oval shaped for properly fitting the wearer's hair and that flange F is similarly oval shaped.

In Figs. 3, 4 and 5 there are shown the parts of the cap prior to their assembly with each other in accordance with the present invention. As shown in Figs. 3 and 4, the cap body Ca comprises two flat layers 10 of unvulcanized rubber seamed together at their peripheral edges 12 and open at their bottom edges 14. The cap body in this condition is produced by subjecting two superposed flat sheets of unvulcanized rubber to the action of a seaming and cutting die which simultaneously cuts the layers 10 to the shape illustrated herein, or to any other desired shape, and unites the peripheral edges 12 thereof. The annular, oval shaped member Fa for forming the flange F of the cap is formed by die cutting the same from a sheet of unvulcanized rubber. The cap body Ca and the flange forming part Fa are then assembled on a form, united with each other, ornamented and vulcanized in the manner which will now be described.

Referring now more particularly to Figs. 6 to 10 of the drawings, in manufacturing bathing caps of the type illustrated in Figs. 1 and 2, there is utilized a sectional mold or form of iron, aluminum, or of any other rigid material having good heat conducting properties and shaped to impart to the article the desired contour thereof. Thus, as illustrated in Fig. 6, the form is shaped to impart to the flat bathing cap shown in Figs. 3 and 4 approximately the shape of the human head. Said lower form comprises sections 20 and 22 having confronting surfaces 24 and 26 between which flange forming part Fa is positioned and held. It will be understood that surfaces 24 and 26 are appropriately shaped to position flange forming part Fa in proper relation to the inner surface of cap body Ca for the attachment of the outer edge of said flange forming part in proper relation to the lower edge 14 of the cap body so that said flange forming part will be united with the cap body along a peripherally extending line so that the flange will be positioned properly at the front and back and at the sides of the cap as hereinbefore described with reference to Figs. 1 and 2. The sections of the form are provided with means for releasably securing them together in position to clamp flange forming part Fa therebetween. For this purpose mold section 22 is provided with a rod 28 fixed to the interior of said mold section and extending therefrom through the interior of section 20 and through a hollow shank 30 formed at the lower part of section 20. When section 22 is seated on section 20 the screw-threaded end 32 of rod 28 projects beyond the free end of shank 30 for engagement by a wing-nut 34 for releasably fastening the mold sections together with the flange forming part Fa therebetween as illustrated in Fig. 7.

As clearly shown in Fig. 7, flange forming part Fa is so dimensioned in relation to the form that an outer marginal edge portion thereof projects beyond the outer surface of the form completely therearound. Said projecting portion of flange forming part Fa may vary in width within obvious practical limits, but preferably is about one-eighth of an inch in width.

After flange forming part Fa is positioned between form sections 20 and 22, as illustrated in Fig. 7, the cap body Ca is placed upon the form and snugly fitted thereover, as illustrated in Fig. 8. Then said cap body is caused to conform to the contour of the form by means of a highly flexible detachable member 36, preferably of textile material, and which as here shown, is in the form of a bag having an open mouth defined by a hem 38 and provided with draw strings 40 by which the mouth of the bag can be gathered and closed about the lower part of the form and tied to pins 42 which are fixed to and project from shank 30 on form section 20. Flexible member 36 causes cap body Ca to conform to the contour of the form under pressure and unites said cap body with the projecting portion of flange forming part Fa, said draw strings serving to draw and hold said member 36 under pressure on cap body Ca.

Preferably member 36 also constitutes a flexible design impression element or pattern-carrying member for forming in the unvulcanized cap body Ca surface designs or relief patterns which become permanent when the cap body is vulcanized. For this purpose said member 36 is provided with a surface design corresponding with the design to be created on the surface of the cap. Accordingly, member 36 may be knitted, netted, crocheted, woven or otherwise formed to produce the desired ornamental effect, and it will be understood that a large variety of designs can be obtained by utilizing different design impression elements. An important characteristic of member 36 is its high degree of flexibility which allows it to conform readily to the form and to the object positioned thereon free from folds or creases in order to obtain a good relief design on the article without forming unsightly marks or impressions therein.

After conforming member 36 is applied over the cap body Ca, as illustrated in Fig. 9, with the cap body snugly and smoothly conforming to the contour of the form and united with the projected portion of flange forming part Fa, the cap C is vulcanized while thus held on the form by member 36. Vulcanization is effected preferably in a suitable vulcanization apparatus under dry heat.

The construction of the form utilized in the method described above is more specifically illustrated in Figs. 11 to 14. It will be observed that the form is hollow and that at least one section thereof, here shown as section 20, is provided with a plurality of openings 44 for the passage of hot air or other heating fluid into the form to accelerate vulcanization of the cap and the flange thereof. It will be observed that confronting surfaces 24 and 26 of the form sections are curved from their rear edges 46 to their front edges 48, said surfaces however being non-curved in a direction extending between the opposite side edges 50 and 52 of said form sections respectively. Form section 20 is provided with dowel pins 54 and form section 22 is provided with dowel recesses 56 for properly aligning the two form sections in assembled relation. Further, form section 20 is provided with a plurality of pins 58 which may vary in number and which are adapted to be engaged by the inner edge of flange forming part Fa when the latter is in proper position on said form section thus serving to properly position said flange forming part on said form section. Form section 22 is provided with corresponding recesses 60 for receiving positioning pins 58.

As clearly shown in Fig. 14, shank 30 has an outer non-circular, here shown as rectangular or square cross section, and is provided with a reduced end portion 62 of similar cross-section forming a shoulder 64 adjacent the lower end of said shank. Thus, as illustrated in Figs. 11, 14 and 15, the form may be mounted in a suitable support S by inserting end portion 62 of the shank of the form in an opening 66 provided in said support, said opening conforming in size and shape substantially to the size and cross sectional shape of said end portion 62, shoulder 64 resting upon the top of said support. As illustrated in Fig. 15, support S may be in the form of a rigid metal plate of suitable width having downwardly reflexed end portions 68 by which the central portion 70 of the form is raised above the table or bench B on which said support is mounted, providing a space for manipulation of the wing-nuts 34. Support S is constructed and arranged for carrying a plurality of the forms during the assembly of the parts of the cap on the forms and also during the vulcanization of said caps. For this purpose, support S is removably associated with table or bench B whereby to permit said support and the forms carried thereby to be transferred as a unit from said table to the vulcanization chamber or apparatus.

Thus, it is seen that the method and apparatus herein shown and described are well adapted to accomplish the several objects of the present invention. It will be understood, however, that variations in the method may be made within the scope and spirit of the invention and that likewise the apparatus may be varied in details of construction and arrangement of parts without departing from the spirit of the invention. It will be understood also that while the invention has been described in connection with the manufacture of bathing caps, said method, as will occur to those skilled in the art relating to the manufacture of rubber articles, may be utilized for other purposes and in connection with the manufacture of other articles. Therefore, I do not wish to be limited precisely to the method or to the apparatus herein shown or described, except as may be required by the appended claims considered with reference to the prior art.

Having thus described my invention, what I claim and desire to secure by Letters Patent is:

1. The method of making a bathing cap or other pouch-like article from vulcanizable sheet material in which method is utilized a sectional form which has an outer surface and confronting surfaces on the respective sections disposed transversely of said outer surface, said method comprising placing a strip composed of said sheet material between the confronting surfaces of said form sections with a marginal edge portion of said strip projecting outwardly of the form beyond said outer surface thereof, placing another part of said article over said outer surface of the form in surface to surface relation therewith whereby to engage a surface portion of said other article part with the projecting portion of said first mentioned article part and pressing said portions together and then vulcanizing said parts to permanently unite them.

2. The method of making a bathing cap or other pouch-like article from vulcanizable sheet material in which method is utilized a sectional form which has an outer surface and confronting surfaces on the respective sections disposed transversely of said outer surface, said method comprising placing a strip composed of said sheet material between the confronting surfaces of said form sections with a marginal edge portion of said strip projecting outwardly of the form beyond said outer surface thereof, placing another part of said article over said outer surface of the form in surface to surface relation therewith whereby to engage a surface portion of said other article part with the projecting portion of said first mentioned article part, placing a flexible member over said other article part on the form and exerting pressure to conform said part to the form and to press said part against said projecting portion of the first mentioned article part, and then vulcanizing said parts.

3. The method of making a bathing cap or other pouch-like article from vulcanizable sheet material in which method is utilized a sectional form which has an outer surface and confronting surfaces on the respective sections disposed transversely of said outer surface, said method comprising placing a strip composed of said sheet material between the confronting surfaces of said form sections with a marginal edge portion of said strip projecting outwardly of the form beyond said outer surface thereof, placing another part of said article over said outer surface of the form in surface to surface relation therewith whereby to engage a surface portion of said other article part with the projecting portion of said first mentioned article part, placing a flexible pattern-carrying member over said other article part on the form and exerting pressure to conform said part to the form, to impress a design in the outer surface of said part, and to press the inner surface of said part against said projecting portion of the first mentioned article part, and then vulcanizing said parts.

4. The method of making a bathing cap or other pouch-like article of vulcanizable material having a strip of vulcanizable material united at its edge with the body of the article interiorly thereof, which method comprises providing in initially separate relation and in unvulcanized condition a pouch-like member and a strip to be united with said member, assembling said pouch-like member and strip on a form of the desired curvature of the article with said strip disposed interiorly of said member, pressing a marginal edge portion only of said strip into engagement with the surface portion of said member for uniting said edge portion to said member while leaving the remaining portion of the strip free from direct attachment to said member, and then vulcanizing said member and the strip attached thereto.

5. The method of making a bathing cap or other pouch-like article of vulcanizable material having a strip of vulcanizable material united at its edge with the body of the article interiorly thereof, which method comprises providing in initially separate relation and in unvulcanized condition a pouch-like member and a strip to be united with said member, assembling said pouch-like member and strip on a form of the desired curvature of the article with said strip disposed interiorly of said member, placing a flexible pattern-carrying member over said pouch-like member on the form, and exerting pressure on said pattern member to conform the pouch-like member to the form and to press said pouch-like member against a marginal edge portion of said strip, holding the rest of said strip out of contact with said pouch-like member, then vulcanizing said pouch-like member and strip, and then removing said flexible pattern-carrying member.

6. A form for making pouch-like articles from initially separate parts composed of vulcanizable material, comprising a body having an outer surface conforming to the contour of the article, said body being formed in sections having confronting surfaces extending transversely of said outer surface and constructed and arranged to clamp therebetween an initially separate part of said article in position substantially normal to the inner surface of the pouch-forming part of said article, and means projecting from one of said confronting surfaces for positioning said part between said surfaces in predetermined relation to the outer surface of said body, and means for securing said sections in releasable clamping relation.

7. Apparatus of the class described for making flanged pouch-like articles from initially separate parts composed of vulcanizable sheet material, comprising a form having an outer surface conforming to the contour of the article, said form being formed in sections having confronting surfaces extending transversely of said outer surface and constructed and arranged to clamp therebetween an initially separate flange-forming part of said article therebetween in position substantially normal to the inner surface of the pouch-forming part of said article, means for securing said sections in releasable clamping relation, means for positioning said flange-forming part between said surfaces in predetermined relation to the outer surface of said body, and a flexible member for reception over the form for conforming the pouch-like part to the contour of the form and for pressing said pouch-forming part of the article against a marginal edge portion of said flange-forming part for uniting said pouch-forming part to said flange-forming part.

8. A form for making pouch-like articles from vulcanizable material, comprising a body having an outer surface conforming to the contour of the article, said body being formed in sections having confronting curved surfaces extending transversely of said outer surface and constructed and arranged to clamp therebetween an initially separate part of said article in position substantially normal to the inner surface of the pouch-forming part of said article, the curvature of said surfaces being designed to variably position the different edge portions of said part of said article therebetween in predetermined relation to said surface of the pouch-forming part, means for securing said sections in releasable clamping relation, and means for positioning said flange-forming part between said surfaces in predetermined relation to the outer surface of said body.

9. Apparatus of the class described for making flanged pouch-like articles from initially separate parts composed of vulcanizable sheet material, comprising a form having an outer surface conforming to the contour of the article, said form being formed in sections having confronting surfaces extending transversely of said outer surface and constructed and arranged to clamp therebetween an initially separate flange-forming part of said article in position substantially normal to the inner surface of the pouch-forming part of said article, means for securing said sections in releasable clamping relation, means for positioning said flange-forming part between said surfaces in predetermined relation to the outer surface of said body, and means for pressing said pouch-forming part of the article against a marginal edge portion of said flange-forming part for uniting said pouch-forming part to said flange-forming part.

ROLAND H. GUINZBURG.